J. JORDAN.
Corn Sheller.

No. 92,056.  Patented June 29, 1869.

Witnesses:
E. W. Anderson.
James P. Greves.

Inventor:
John Jordan.
Chipman, Hosmer & Co
attys.

JOHN JORDAN, OF RED WING, MINNESOTA.

Letters Patent No. 92,056, dated June 29, 1869.

IMPROVEMENT IN CORN-SHELLERS.

The Schedule referred to in these Letters Patent and making part of the same.

*To all whom it may concern:*

Be it known that I, JOHN JORDAN, of Red Wing, in the county of Goodhue, and State of Minnesota, have invented a new and valuable Improvement in Corn-Shellers; and I do hereby declare that the following is a full, clear, and exact description of the construction and operation of the same, reference being had to the annexed drawings, making a part of this specification, and to the letters and figures of reference marked thereon.

Figure 1:
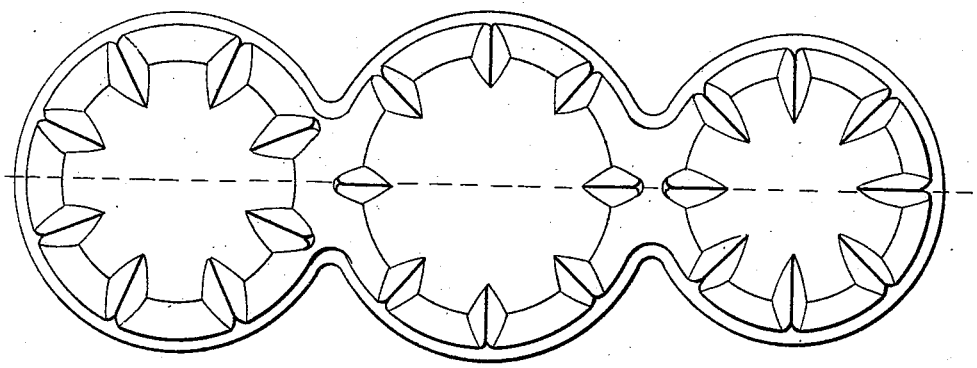

Figure 1, of the drawings, is a plan view of my invention.

Figure 2:
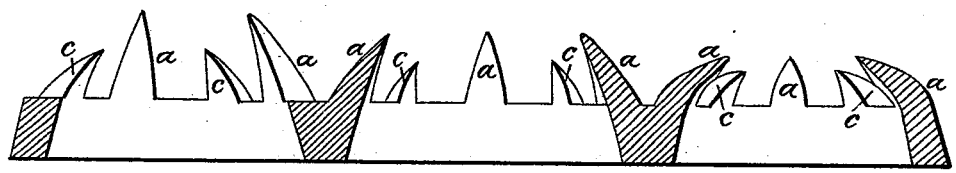

Figure 2 is a longitudinal section of the same.

My invention relates to means for shelling corn; and

It consists mainly in the construction and novel arrangement of devices, by which a neat and effective sheller is formed, for hand-use.

The three circular forms shown on the drawings represent shellers of different sizes, connected together in one long plate. They are, respectively, cast, of iron or brass, in one mould adapted to that purpose.

My object in forming three shellers, connected as shown, and of varying sizes, is to furnish means for shelling ears of different sizes.

The number of the forms may be increased, if necessary; but it is desirable to furnish at least three of these shellers upon a plate.

The letters *a* represent teeth, extending downward upon the same curve as the interior of the dishes or forms; and The letters *c* represent teeth, extending downward from the lower side of the form or dish; but they are of lesser length than teeth *a*, and have a sharper curve inward, as shown.

The teeth *a* and *c* are arranged, alternately, on the lower sides of said forms or dishes.

To operate my shellers, I take an ear of corn, and thrust it into a dish adapted to its size, the small end foremost, and, with a twisting motion, pass it nearly through the dish. I then reverse the position of the dish, and, taking the cob by its small end, draw it through with a similar twisting movement. This process separates the corn from the cob with great ease and perfection.

What I claim as my invention, and desire to secure by Letters Patent, is—

A corn-sheller of concave form, as shown and described, and having teeth, *a* and *c*, attached thereto, constructed and arranged to operate substantially as specified.

In testimony that I claim the above, I have hereunto subscribed my name, in the presence of two witnesses.

JOHN JORDAN.

Witnesses:
 PHIL. SKILLMAN,
 N. LOFGRIHL.